United States Patent [19]
Lang

[11] Patent Number: 5,192,170
[45] Date of Patent: Mar. 9, 1993

[54] PNEUMATIC TUBE CONVEYOR STATION

[75] Inventor: Hartmut Lang, Plochingen, Fed. Rep. of Germany

[73] Assignee: Infotronic Vertriebsgesellschaft fuer Kommunikationssysteme mbH, Plochingen, Fed. Rep. of Germany

[21] Appl. No.: 761,681

[22] Filed: Sep. 18, 1991

[51] Int. Cl.⁵ .................... B65G 51/28; B65G 51/44; B65G 51/36

[52] U.S. Cl. ..................................... 406/147; 406/52; 406/37

[58] Field of Search ................. 406/4, 31, 37, 52, 147

[56] References Cited

U.S. PATENT DOCUMENTS 2,043,293  6/1936  Jennings ................................. 406/4

FOREIGN PATENT DOCUMENTS 1255046 11/1967 Fed. Rep. of Germany ...... 406/110
2420459 10/1975 Fed. Rep. of Germany ...... 406/112
  12520  1/1986 Japan .................................. 406/110
1416393 12/1975 United Kingdom ................ 406/110

Primary Examiner—Johnny D. Cherry
Assistant Examiner—James M. Kannofsky
Attorney, Agent, or Firm—Porter, Wright, Morris & Arthur

[57] ABSTRACT

A pneumatic tube conveyor station comprises a loading position for conveying cases (11) to be dispatched, in which the latter are placed in a waiting position on a supporting surface, ready for being collected. The conveying cases (11) are provided with a machine-readable label (61) for identifying the station of destination and for routing the conveying cases. A label scanner (51) is arranged at the pneumatic tube conveyor station (10). The supporting surface is designed as a rotary disc (41) which has a drive (43) connected to the label scanner (51) via a signal line (65).

5 Claims, 3 Drawing Sheets

PNEUMATIC TUBE CONVEYOR STATION

The present invention relates to a pneumatic tube conveyor station comprising a loading position for conveying cases to be dispatched, in which conveying cases are placed in a waiting position on a supporting surface, ready for being collected.

It has been known in pneumatic tube conveyor technology to provide stations which are suited for dispatching and/or receiving pneumatic tube conveying cases. If the pneumatic tube conveyor stations are to be capable of dispatching conveying cases, then such stations are provided with a loading position where the conveying cases are introduced by the user. The loading position may be designed, for example, as a short tube section with open top, into which individual conveying cases or groups of conveying cases can be inserted one by one. The conveying cases are usually kept in waiting positions, for example by means of a pivoting lever blocking the loading position at the top and forming a supporting surface, or by means of a delimiting surface of a rotor, as will be described in more detail further below. When the forwarding tube is empty, the path is cleared immediately for the waiting conveying case, and the latter usually drops under the effect of gravity either directly into the forwarding tube, or initially into a rotor by which it is then moved into a position aligned with the forwarding tube.

It has been known in this connection to equip pneumatic tube conveyor stations with what is known as a rotor. This rotor comprises one or more tube sections of straight or curved design, and can be rotated about an axis extending parallel to the tube sections, or about an axis extending perpendicularly thereto. In both cases, the rotor initially is set in such a way that the loading position is closed on top by a delimiting surface of the rotor so that a conveying case can be placed in a waiting position, ready for being collected. Then, when the rotor is rotated, one of the tube sections is brought into alignment with the loading position so that the conveying case to be dispatched can drop into the tube section. The arrangement may be selected in such a way that the lower end of the tube section on its turn is closed by a corresponding countersurface of the housing so that the conveying case is now "trapped" in the rotor. By rotating the rotor, it is now possible to bring the tube section with the conveying case to be dispatched into an aligned position with the forwarding tube so that the conveying case can now be caused to enter the forwarding tube system of the pneumatic tube conveyor.

Another problem encountered with pneumatic tube conveyor systems is the identification of the station of destination to which the respective conveying case is to be transported. Apart from older proposals to provide conveying cases with coding rings or other mechanical coding marks, it has also been known to provide the conveying cases with a machine-readable label. In this case, before loading a conveying case into the system, the user of the pneumatic tube conveyor system must first introduce the conveying case to a label reader so that the latter can read the information regarding the station of destination and set the pneumatic tube conveyor system correspondingly.

In the case of certain known pneumatic tube conveyor systems, the sender of the conveying case has an adhesive label, which contains the machine-readable destination code, printed by a suitable printer, and fixes the label manually on the conveying case to be dispatched. As a result of this procedure the position of the label on the conveying case is not accurately defined so that in order to enable the destination code to be read by the label reader before the conveying case is dispatched, the case must be moved past the label reader (or vice versa) manually.

Now, it is the object of the present invention to improve a pneumatic tube conveyor station of the type described above in such a way that the loading procedure for conveying cases to be dispatched can be further automated and, consequently, the efficiency of pneumatic tube conveyor systems can be considerably improved.

The invention achieves this object by the fact that the conveying cases are provided with a machine-readable label for identifying the station of destination and for routing the conveying cases, that a label reader is arranged at the pneumatic tube conveyor station, and that the supporting surface is designed as a rotary disc which has a drive connected to the label reader via a signal line. Consequently, while the invention makes use of the known feature to provide conveying cases with machine-readable labels carrying information regarding the destination of the conveying case to be dispatched, it automates additionally the reading process to such an extent that the mechanical reading process no longer has to be supported manually. In the case of the pneumatic tube conveyor station according to the invention, it is now only necessary to place the conveying case on the rotary disc which then rotates the conveying case until the label reader has found a reading position for the label, whereupon the rotary disc is stopped for a short time to enable the label to be scanned.

According to a preferred further development of the invention, the conveying cases are placed on the rotary disc by a first end face and the label is positioned on their opposite end face.

This feature provides the advantage that the conveying cases, which are cylindrical in shape, can be rotated in a simple way and need not be rolled, and that it is only necessary to apply the label in a given area of the end face of the conveying case where it can be found by the label reader itself during rotation of the conveying case.

According to another preferred embodiment of the invention, where a rotor is arranged in a housing of the pneumatic tube conveyor station for collection of the conveying cases and where the housing comprises a holder for the conveying cases to be collected, in which case a delimiting surface of the rotor forms a supporting surface in a first operating position, and a tube section, which is open on top, is moved below the holder in a second operating position of the rotor, it is particularly preferred if the rotary table is integrated into the rotor.

This feature provides the advantage that the conventional and technically proven rotary or rotor technique can be used also in combination with pneumatic tube conveyor stations according to the invention which offer in addition the possibility to rotate the conveying cases for safe mechanical reading of the destination labels.

According to a further development of this variant of the invention, the rotor is arranged to rotate about a vertical axis, and the axes of the tube section and of the rotary disc extend in parallel to that axis.

This feature offers the advantage to result in a particularly compact and mechanically simple structure.

Finally, another variant of this embodiment of the invention is preferred where the drive of the rotary disc is fed via a drive connection which is run from the outside of the rotor through the rotor axis.

This feature provides the advantage that the drive of the rotary disc is implemented by particularly simple means, technically, and that the drive unit as such can be located outside the rotor.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawing in which.

Figure 1:
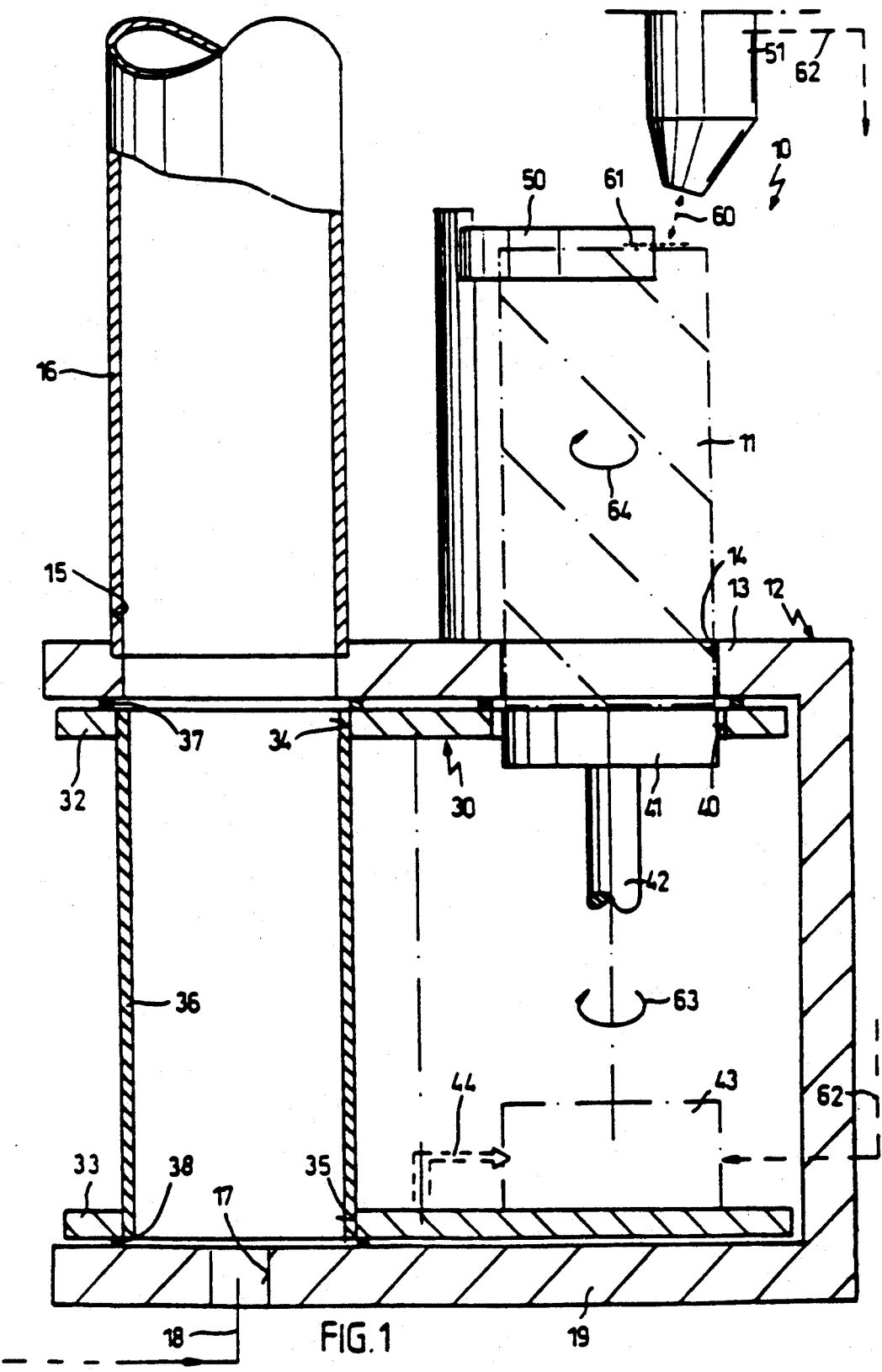
FIG. 1 shows a side view, partially cut away, through one embodiment of a pneumatic tube conveyor station according to the invention, in a first operating condition.

Regarding now the figures, reference numeral 10 indicates generally a pneumatic tube conveyor station intended for dispatching conveying cases 11. The pneumatic tube conveyor station comprises for this purpose a stationary housing 12 provided with a horizontal cover plate 13. The upper face of the cover plate 13 displays a first recess 14 and, at a certain distance therefrom, a second recess 15. While the first recess 14 serves for receiving conveying cases 11 which can be inserted therein at a small radial play, a forwarding tube 16 is connected pressure-tight to the second recess 15 and extends radially upwardly therefrom.

Coaxially to the second recess 15, a third recess 17, with a compressed air line 18 connected thereto, is provided in a bottom plate 19 of the housing 12 which extends in parallel to the cover plate 13.

The parallel plates 13, 19 of the housing 12 accommodate between them a rotor 30 adapted to rotate about a vertical axis 31. The rotor 30 consists substantially of an upper rotary plate 32, arranged in parallel to the cover plate 13 and closely below the latter, and lower rotary plate 33 arranged in parallel to the bottom plate 19 and closely above the latter.

The upper rotary plate 32 is provided with a fourth recess 34, the lower rotary plate 33 with a fifth recess 35, the two recesses 34, 35 being aligned one with the other. The recesses 34, 35 accommodate between them a full-length open-ended tube section 36. At the sides of the rotary plates 32, 33 facing the plates 13, 19, respectively, the recesses 34, 35 are surrounded by sliding seals 37, 38 of a type known in the art. The seals 37, 38 have the effect that the interior of the tube section 36 is at any time connected pressure-tight in upward and downward directions with the cover plate 13 and the bottom plate 19, respectively, of the housing 12, and this even during rotation of the rotor 30.

At a certain distance from the fourth recess 34, a sixth recess 40 is provided in the upper rotary plate 32. The sixth recess 40 accommodates supporting means designed as a rotary disc 41 which can be rotated via a vertical shaft 42 and a first drive 43. The first drive 43 may be either an independent drive motor, or a drive transmission, with a drive connection 44 to the exterior of the rotor 30.

In the case of the embodiment illustrated in FIG. 1, the drive connection 44 is effected through the axis 31.

At the side of the first recess 14 in the cover plate 13, one can see a stand with a holder extending in an upward direction from the cover plate 13, which provides a lateral support for the upper end of a conveying case 11 seated in the first recess 14. Above the holder 50, a stationary label reader 51 (scanner) can be seen.

The function of the pneumatic tube conveyor station illustrated in FIG. 1 will now be explained in more detail by reference to the phase illustrations of FIGS. 1 to 3:

In the initial position illustrated in FIG. 1, the rotor 30 occupies a rotary position in which the tube section 36 is in alignment with the forwarding tube 16. The tube section 36 is open on top so that a full-width passage exists between the tube section 36 and the forwarding tube 16.

The rotary disc 41, which is arranged symmetrically to the tube section 36, relative to the axis 31 of the rotor 30, is positioned below the first recess 14 in the cover plate 13 of the housing 12, in the initial position illustrated in FIG. 1.

When the station occupies this initial position, and the rotor is in this first angular position a user of the pneumatic tube conveyor station may place a conveying case 11 in the loading position formed by the first recess 14 and the holder 50. The conveying case 11 fitting into the first recess 14 at a small radial play, as has been described before, it is held safely in this position on the rotary disc 41.

Now, the scanner 51 sends a scanning beam 60 in downward direction upon the upper end face of the conveying case 11, which latter carries in this area a label 61 containing machine-readable information regarding the destination of the respective conveying case 11.

Since the conveying case 11 has been placed into the loading position in an arbitrary way as regards its rotary position, the scanner 51 normally will not be in a position to read the label 61 at once. Consequently, a control command will be supplied, via a first signal line 62, to the first drive 43 of the rotary disc 41, whereby the rotary disc 41 will be set into rotation, as indicated by arrow 63. This will of course cause the conveying case 11 positioned on the rotary disc 41 to rotate at the same time, as indicated by an additional arrow 64. The rotary movement of the conveying case 11 continues until the label 61 has entered the geometrical area which is covered by the scanning beam. As soon as the scanner 51 detects that the label 61 is in a reading position, a stop signal is sent immediately to the first drive 43, via the first signal line 62, and the conveying case 11 is stopped, whereupon the scanner 51 can read the label 61 at rest.

Figure 2:
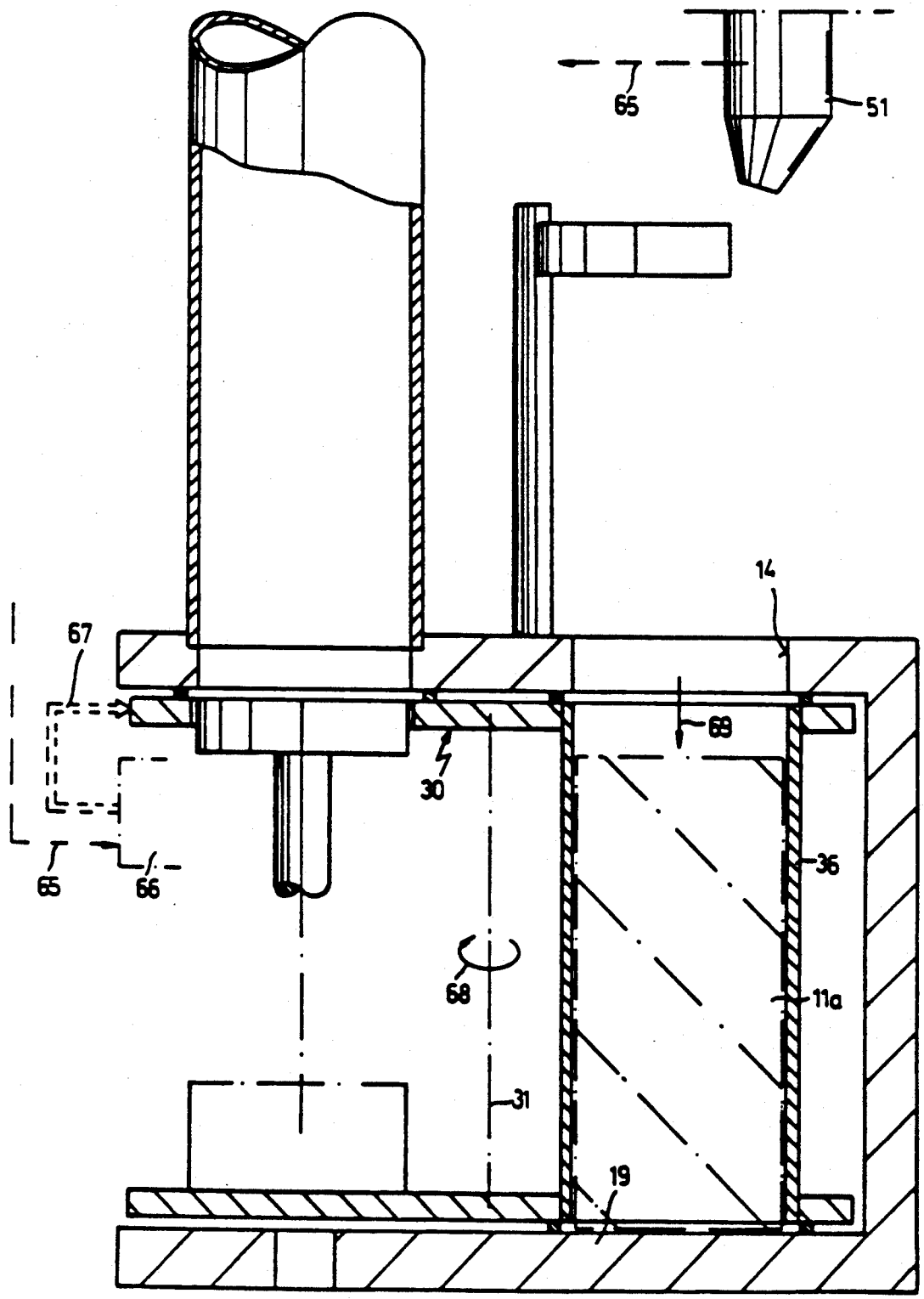
FIG. 2 shows the pneumatic tube conveyor station according to FIG. 1, in a second operating condition.

During this operating phase, the scanner 51 sends a signal to a second drive 66 for the rotor 30, via a second signal line 65, as indicated in FIG. 2. The second drive 66 may consist, for example, of a belt drive engaging the circumference of the rotary plates 32 or 33, as is indicated diagrammatically by the drive connection 67 in FIG. 2.

When the second drive 66 is activated in this way, the rotor 30 will start rotating about the axis 31, as indicated by arrow 68 in FIG. 2. During this rotation, the conveying case 11 remains initially in the position indicated in FIG. 1, its bottom face sliding along the rotating upper rotary plate 32 which is of flat design, except for the recesses 34 and 40.

Now, when a mirror-symmetrical position relative to the position illustrated in FIG. 1 is reached upon completion of a given rotary movement, in the present example after a rotary angle of 180°, the rotor has reached its second angular position and the tube section 36 will find itself below the first recess 14. This has the consequence that the conveying case will drop through the first recess and into the tube section 36, as indicated by arrow 69 and conveying case 11a in FIG. 2. The conveying case 11a comes to rest on the top face of the bottom plate 19, though being held laterally by the tube section 36.

Figure 3:
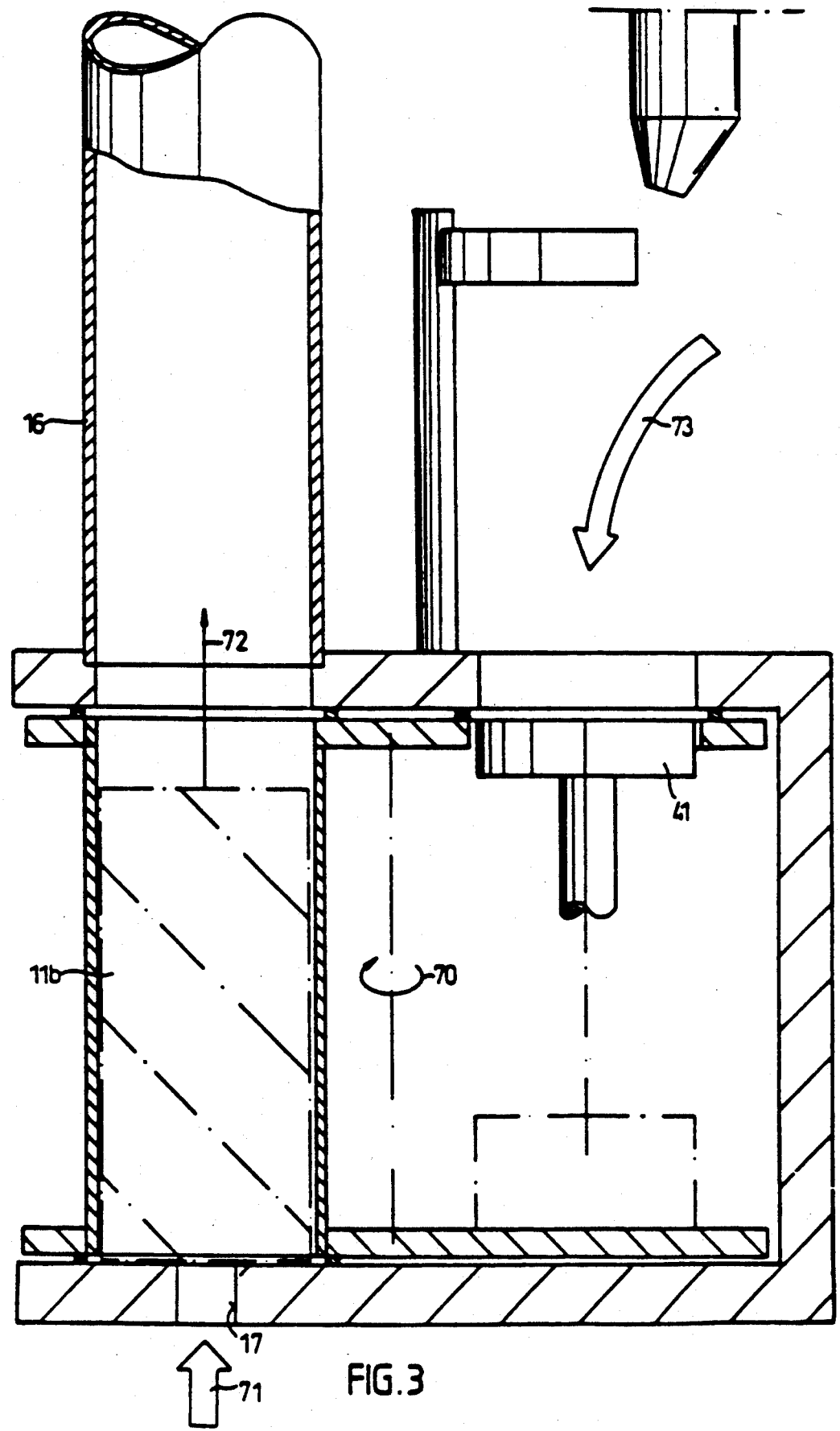
FIG. 3 shows the pneumatic tube conveyor station of FIG. 1, in a third operating condition.

Once this operating phase is completed, which may be detected for example by proximity switches or sensors, another control command is supplied to the second drive 66 of the rotor 30 causing it to turn the rotor 30 back into its initial position, as indicated by arrow 70 in FIG. 3.

The conveying case 11b now occupies a position below the forwarding tube 16. When an air current is now blown into the third recess 17 through the compressed air line 18 illustrated in FIG. 1, as indicated by arrow 71 in FIG. 3, the conveying case 11b is dispatched in upward direction and into the forwarding tube 16, as indicated by arrow 72 in FIG. 3.

During this process, the user may already place the next conveying case on the rotary disc 41, as indicated by arrow 73 in FIG. 3.

Generally, the pneumatic tube conveyor station 10, therefore, serves the function to bring each conveying case that has been placed in the loading position into a proper reading position for the scanner 51, by rotation of the case, and to dispatch it thereafter fully automatically once the destination coordinates of the conveying case have been identified.

I claim:

1. A pneumatic tube conveyor station, comprising:
   a conveyor case for conveying goods between said station and another station of a tube conveyor system, said conveyor case being provided with a machine-readable label bearing identification and routing information about said other station;
   a housing comprising a loading position for loading said conveyor case to be dispatched to said other station and supporting means for placing said conveyor case thereon, said supporting means being rotatable under the action of drive means; and
   label reading means arranged adjacent said supporting means and being connected to said drive means for reading said identification and routing information from said label when said conveyor case is rotated by said supporting means.

2. The station of claim 1, wherein said conveyor case is placed on said supporting means with a first end face thereof, said label being positioned on an opposite end face.

3. The station of claim 1, wherein a rotor is provided in said housing for collecting said conveyor case from said loading position, said rotor comprising said supporting means with said drive means and an open-ended tube section for retaining said conveyor case, said rotor being driven under the action of rotating means for placing said supporting means and said drive means underneath said loading position in a first angular position, and placing said open-ended tube section underneath said loading position in a second angular position.

4. The station of claim 3, wherein said rotor is arranged to rotate about a vertical axis, and axes of said open-ended tube section as well as of said rotatable supporting means extend in parallel to said rotor vertical axis.

5. The station of claim 3 wherein said drive means are fed through a drive connection being run from outside said rotor through said rotor axis.

* * * * *